(12) United States Patent
Donneau-Golencer et al.

(10) Patent No.: US 9,195,640 B1
(45) Date of Patent: Nov. 24, 2015

(54) METHOD AND SYSTEM FOR FINDING CONTENT HAVING A DESIRED SIMILARITY

(75) Inventors: Thierry D. Donneau-Golencer, Menlo Park, CA (US); Stephen L. Hardt, Woodinville, WA (US)

(73) Assignee: SRI INTERNATIONAL, Menlo Park, CA (US)

( * ) Notice: Subject to any disclaimer, the term of this patent is extended or adjusted under 35 U.S.C. 154(b) by 383 days.

(21) Appl. No.: 13/336,360

(22) Filed: Dec. 23, 2011

Related U.S. Application Data

(63) Continuation-in-part of application No. 12/632,491, filed on Dec. 7, 2009.

(60) Provisional application No. 61/144,117, filed on Jan. 12, 2009, provisional application No. 61/219,259, filed on Jun. 22, 2009.

(51) Int. Cl.
| | |
|---|---|
| *G06F 17/27* | (2006.01) |
| *G06F 17/28* | (2006.01) |
| *G06F 17/21* | (2006.01) |
| *G10L 15/00* | (2013.01) |

(52) U.S. Cl.
CPC ............... *G06F 17/27* (2013.01); *G06F 17/21* (2013.01); *G06F 17/28* (2013.01); *G10L 15/00* (2013.01)

(58) Field of Classification Search
CPC ... G06F 17/271; G06F 17/274; G06F 17/277; G06F 17/2755; G06F 17/2735; G06F 17/2863; G06F 17/2785; G10L 15/183; G10L 15/1815; G10L 15/1822; G10L 15/19; G10L 15/193

USPC .............................................. 704/7–10, 257
See application file for complete search history.

(56) References Cited

U.S. PATENT DOCUMENTS

| | | | |
|---|---|---|---|
| 5,920,316 A | 7/1999 | Oran et al. | |
| 6,298,344 B1 | 10/2001 | Inaba et al. | |
| 6,981,040 B1 | 12/2005 | Konig et al. | |
| 7,003,515 B1 | 2/2006 | Glaser et al. | |
| 7,076,546 B1 | 7/2006 | Bates et al. | |
| 7,457,872 B2 | 11/2008 | Aton et al. | |
| 7,496,567 B1 | 2/2009 | Steichen | |
| 7,587,411 B2 | 9/2009 | De Vorchik et al. | |
| 7,689,933 B1 | 3/2010 | Parsons | |
| 7,747,621 B2 | 6/2010 | Sato et al. | |
| 8,005,832 B2 | 8/2011 | Andrieu | |
| 8,056,007 B2 | 11/2011 | Rupp et al. | |
| 8,069,186 B2 | 11/2011 | Farnham et al. | |
| 8,099,407 B2 | 1/2012 | Auerbach et al. | |
| 2002/0156760 A1* | 10/2002 | Lawrence et al. | 707/1 |

(Continued)

OTHER PUBLICATIONS

Response to Final Office Action, filed Apr. 25, 2013 for U.S. Appl. No. 13/149,536, 13 pages.

(Continued)

*Primary Examiner* — Leonard Saint Cyr
(74) *Attorney, Agent, or Firm* — Barnes & Thornburg LLP; Thomas J. McWilliams; Edward F. Behm, Jr.

(57) ABSTRACT

A method and system for finding content having a desired similarity to an input or source content includes using a similarity model including information and associations derived from content processed by one or more content analyzers to find and/or arrange content having a desired type and/or degree of similarity to the input or source content.

33 Claims, 5 Drawing Sheets

(56) References Cited

U.S. PATENT DOCUMENTS

| | | |
|---|---|---|
| 2003/0004716 A1* | 1/2003 | Haigh et al. ............... 704/238 |
| 2004/0220925 A1* | 11/2004 | Liu et al. ...................... 707/3 |
| 2004/0267700 A1 | 12/2004 | Dumais et al. |
| 2005/0071328 A1 | 3/2005 | Lawrence |
| 2007/0300174 A1 | 12/2007 | Macbeth et al. |
| 2008/0104535 A1 | 5/2008 | DeLine et al. |
| 2008/0126983 A1 | 5/2008 | Keohane et al. |
| 2008/0221892 A1 | 9/2008 | Nathan et al. |
| 2008/0319973 A1* | 12/2008 | Thambiratnam et al. ...... 707/5 |
| 2009/0083814 A1* | 3/2009 | Sekine et al. ............. 725/104 |
| 2009/0199133 A1 | 8/2009 | Deutsch et al. |
| 2009/0249244 A1* | 10/2009 | Robinson et al. ......... 715/781 |
| 2010/0162172 A1 | 6/2010 | Aroner |
| 2010/0179933 A1* | 7/2010 | Bai et al. .................... 706/12 |
| 2010/0180200 A1 | 7/2010 | Donneau-Golencer et al. |
| 2010/0262454 A1* | 10/2010 | Sommer et al. ............ 705/10 |
| 2010/0287033 A1 | 11/2010 | Mathur |
| 2011/0219012 A1* | 9/2011 | Yih et al. .................. 707/749 |
| 2011/0276396 A1 | 11/2011 | Rathod |
| 2011/0295612 A1 | 12/2011 | Donneau-Golencer et al. |
| 2012/0023043 A1* | 1/2012 | Cetin et al. ................. 706/12 |
| 2012/0088219 A1* | 4/2012 | Briscoe et al. ............ 434/362 |
| 2012/0191692 A1* | 7/2012 | Wang ....................... 707/709 |

OTHER PUBLICATIONS

Final Office Action for U.S. Appl. No. 13/149,536, dated Feb. 25, 2013, 26 pages.

U.S. Appl. No. 13/149,319, filed May 31, 2011 to Donneau-Golencer, et al. (Unpublished).

U.S. Appl. No. 13/114,691, filed May 24, 2011 to William S. Mark (Unpublished).

"C2RSS" Overview, downloaded on Oct. 12, 2011 from website: https://pal.sri.com/Plone/framework/Components/learning-applications/c2rss, no date, 3 pages.

"Trapit" downloaded on Oct. 12, 2011 from website: http://trap.it/#!about, founded Jan. 2010, 2 pages.

U.S. Appl. No. 13/298,374, filed Nov. 17, 2011 to Donneau-Golencer, et al. (Unpublished).

"Quantitative Authorship Attribution: A History and an Evaluation of Techniques," https://perswww.kuleuven.be/~u0064311/MAThesis.pdf, 2002.

"Combining Relevance Feedback and Genetic Algorithms in an Internet Information Filtering Engine," Desjardins, G. and R. Godin, proceedings of RIAO 2000; http://www.latece.uqam.ca/publications/GD_RIAO.pdf.

* cited by examiner

METHOD AND SYSTEM FOR FINDING CONTENT HAVING A DESIRED SIMILARITY

CROSS-REFERENCE TO RELATED APPLICATIONS

This application is a continuation-in-part of, and claims priority to and the benefit of U.S. patent application Ser. No. 12/632,491, filed Dec. 7, 2009, which claims priority to and the benefit of U.S. Provisional Patent Application Ser. No. 61/144,117, filed Jan. 12, 2009, and claims priority to and the benefit of U.S. Provisional Patent Application Ser. No. 61/219,259, filed Jun. 22, 2009.

GOVERNMENT RIGHTS

This invention was made in part with government support under contract number NBCHD030010 awarded by the Department of Interior/National Business Center and contract number FA8750-07-D-0185 awarded by the Air Force Research Laboratory. The Government has certain rights in this invention.

BACKGROUND

With the proliferation of wired and wireless telecommunications networks and the steady development of electronic devices that can create, store, modify, and access electronic content (such as tablet computers, smart phones, e-readers, smart TVs, digital cameras, and others), the variety and sheer volume of electronic content available to a user at any given time can seem almost limitless. It is a constant challenge, for software developers and end users alike, to create effective ways to search for, find, and deliver electronic content that most closely corresponds to a user's real, perceived, or anticipated need.

The challenge can be amplified in cases where there is a need or desire to find electronic content that is similar to other content. One reason for this is that the notion of "similarity" can change from one situation to the next, depending on the type of input and/or user preferences, for example.

SUMMARY

According to at least one aspect of this disclosure, a method includes maintaining a computerized similarity model. The similarity model includes information relating to associations of electronic content with other electronic content. The electronic content includes textual and/or non-textual content. The similarity model also includes associations resulting from executing a plurality of computerized content analyzers to extract information from the electronic content. Each content analyzer is associated with at least one similarity metric usable to determine a type or degree of similarity of electronic content. The method also includes determining, using the similarity model, whether any of the electronic content has at least one association in common with an input or source content; and interactively arranging electronic content having a common association with the input or source content based on a desired type or degree of similarity of the electronic content to the input or source content.

The method may include executing a content analyzer configured to identify textual content in the electronic content, identify most important words in the textual content, associate at least one textual element based on the identified most important words with the electronic content, use the at least one textual element to create associations between or among the electronic content, and store the associations between or among the electronic content in the similarity model.

The method may include executing a content analyzer configured to identify textual content in the electronic content, perform semantic analysis of the textual content, associate at least one textual element based on the semantic analysis with the electronic content, use the at least one textual element to create associations between or among the electronic content, and store the associations between or among the electronic content in the similarity model. The method may include executing a content analyzer configured to determine whether the electronic content comprises at least one Uniform Resource Locator and in response to determining that the electronic content comprises at least one Uniform Resource Locator, analyzing electronic content associated with the at least one Uniform Resource Locator.

The method may include executing a content analyzer configured to associate the electronic content with at least one topic, associate at least one textual element with the electronic content based on the association of the electronic content with the at least one topic, use the at least one textual element to create associations between or among the electronic content, and store the associations between or among the electronic content in the similarity model. The method may include executing a content analyzer configured to process electronic content comprising non-textual content, associate at least one textual element comprising textual content relating to the non-textual content with the electronic content, use the at least one textual element to create associations between or among the electronic content, and store the associations between or among the electronic content in the similarity model.

The method may include identifying a graphic in the electronic content, associating at least one textual element comprising textual content relating to the graphic with the electronic content, using the at least one textual element to create associations between or among the electronic content, and storing the associations between or among the electronic content in the similarity model. The method may include determining a layout of the electronic content, associating at least one textual element comprising textual content relating to the layout with the electronic content, using the at least one textual element to create associations between or among the electronic content, and storing the associations between or among the electronic content in the similarity model.

The method may include identifying an image in the electronic content, associating at least one textual element comprising textual content relating to the image with the electronic content, using the at least one textual element to create associations between or among the electronic content, and storing the associations between or among the electronic content in the similarity model.

The method may include executing a content analyzer configured to associate the electronic content with a style of writing, associating at least one textual element relating to the style of writing with the electronic content, using the at least one textual element to create associations between or among the electronic content, and storing the associations between or among the electronic content in the similarity model.

The method may include executing a content analyzer configured to identify textual content in the electronic content, associating the textual content with an indicator of sentiment, associating at least one textual element relating to the sentiment with the electronic content, using the at least one textual element to create associations between or among the electronic content, and storing the associations between or among the electronic content in the similarity model.

The method may include executing a content analyzer configured to associate the electronic content with a subject matter domain, associating at least one textual element comprising textual content relating to the domain with the electronic content, using the at least one textual element to create associations between or among the electronic content, and storing the associations between or among the electronic content in the similarity model.

The method may include executing a content analyzer configured to extract a sequence of textual content from the electronic content, generate a vector representation of the sequence of textual content, the vector representation comprising a plurality of digits, each digit having an association with an aspect of the textual content, associate the vector with the electronic content, use the vector to create associations between or among the electronic content, and store the associations between or among the electronic content in the similarity model.

The method may include determining the desired type or degree of similarity based on at least one of an attribute or textual element associated with the input or source content and at least one input from a user. The method may include monitoring electronic interaction of a user with the electronic content and determining the desired type or degree of similarity based on the user's electronic interaction with the electronic content. The method may include determining the desired type or degree of similarity based on a weight associated with the at least one similarity metric. The method may include adjusting the weight associated with the at least one of the similarity metric to achieve a lesser or greater degree of similarity. The method may include selecting at least one content analyzer from the plurality of content analyzers based on the desired type or degree of similarity and executing only the selected at least one content analyzer.

The method may include performing a clustering analysis on the textual elements associated with the electronic content, performing a clustering analysis on textual elements associated with the input or source content, and identifying clusters associated with both the input or source content and at least one of the electronic content. The method may include ranking electronic content having a common association with the input or source content based on a calculated proximity of the electronic content to the input or source content and interactively arranging the electronic content having a common association with the input or source content based on the ranking.

Where the input or source content comprises a plurality of pieces of electronic content, the method may include merging the plurality of pieces of electronic content into the input or source content. The method may include, for each electronic content having an association in common with the input or source content, calculating a proximity score for each of the at least one similarity metric and arranging the electronic content having an association in common with the input or source content based on the proximity score. The input or source content may be specified by at least one of a user and an automated process.

The method may include associating at least one textual element with the electronic content based on the executing of the plurality of computerized content analyzers. The method may include executing a first content analyzer to perform a first method of analysis of the electronic content and executing a second content analyzer to perform a second method of analysis of the electronic content.

The method may include maintaining a computerized user-specific profile comprising information relating to at least one of user-specific information and user-specific interactions with electronic content, and determining, using the user-specific profile, whether any of the electronic content has at least one association in common with an input or source content.

Also, according to at least one aspect of this disclosure, at least one computer accessible medium includes a plurality of instructions that in response to being executed, result in a computing device analyzing an input or source content using a plurality of content analyzers, where each content analyzer is associated with at least one similarity metric usable to determine a type or degree of similarity of content. The instructions also result in identifying, based on the analyzing of the input or source content using the plurality of content analyzers, at least one piece of electronic content of a plurality of pieces of electronic content that has an association in common with the input or source content; responsively adjusting a weight associated with the at least one similarity metric based on at least one interaction of a user with the identified electronic content; and visually arranging the identified electronic content based on the weight associated with the at least one similarity metric.

The at least one computer accessible medium may be configured to arrange the identified electronic content according to a first similarity metric and re-arrange the identified electronic content according to a second similarity metric. The at least one computer accessible medium may be configured to arrange the identified electronic content into a plurality of clusters, select an electronic content from each cluster, and display only the selected electronic content.

Further, according to at least one aspect of this disclosure, a computing device includes at least one processor, and at least one memory device coupled to the at least one processor, where the at least one memory device has stored therein a plurality of instructions that when executed by the at least one processor, cause the at least one processor to execute a plurality of content analyzers to extract information from each of a plurality of pieces of electronic content. The instructions when executed also cause the at least one processor to maintain a database comprising information relating to associations of the analyzed electronic content with one or more others of the analyzed electronic content based on results of the executing of the plurality of content analyzers, receive a search request from a user, use the database to determine whether any of the analyzed electronic content has a first degree or type of similarity to the search request, output information relating to at least one possible modification of the first degree or type of similarity, receive input from the user relating to the at least one possible modification, and, in response to the received input, use the database to determine whether any of the analyzed pieces of content has a second degree or type of similarity to the search request.

The computing device may be configured to maintain a user-specific database comprising information relating to interactions of a user with electronic content and use the user-specific database to determine whether any of the analyzed pieces of content has the second degree or type of similarity to the search request.

BRIEF DESCRIPTION OF THE DRAWINGS

The invention described herein is illustrated by way of example and not by way of limitation in the accompanying figures. The figures may, alone or in combination, illustrate one or more embodiments of the invention. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
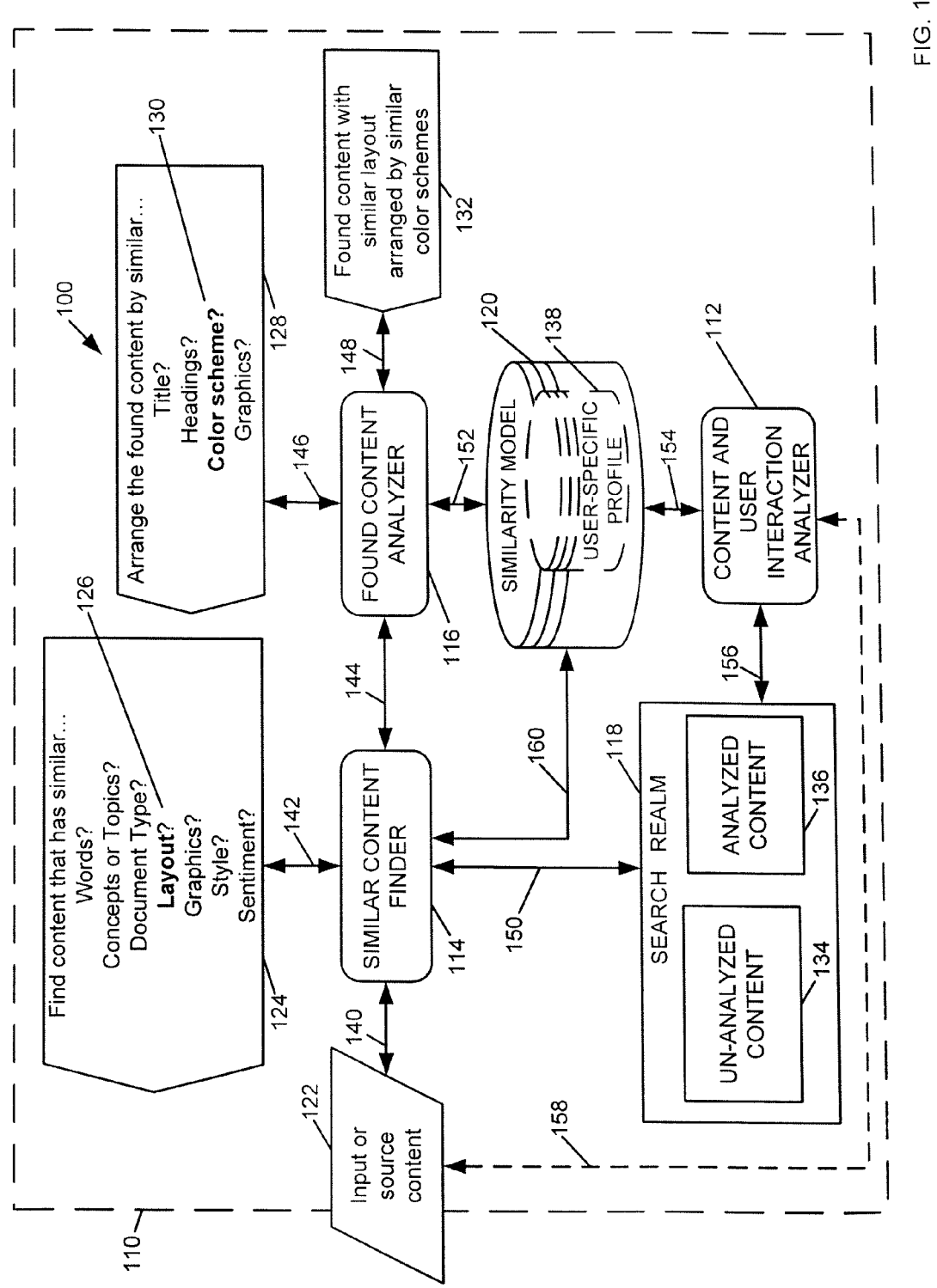
FIG. 1 is a simplified block diagram of at least one embodiment of a content retrieval system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details are set forth in order to provide a more thorough understanding of the present disclosure. It will be appreciated, however, by one skilled in the art that embodiments of the disclosure may be practiced without such specific details. In some instances, details such as control structures and full software instruction sequences have not been shown in order not to obscure the invention. Those of ordinary skill in the art, with the included descriptions, will be able to implement appropriate functionality without undue experimentation.

References in the specification to "one embodiment," "an embodiment," "an illustrative embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored using one or more machine-readable media, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and/or others.

In the drawings, specific arrangements or orderings of schematic elements, such as those representing devices, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C#, C++, Ruby, and/or other programming languages. In some embodiments, an open source information retrieval software library, such as LUCENE, may be used.

Similarly, schematic elements used to represent data or information may be implemented using any suitable electronic arrangement or structure, such as a database, data store, table, record, array, index, hash, map, tree, list, graph, file (of any file type), folder, directory or other grouping of files, header, web page, meta tag, and/or others. For example, in some embodiments, an open source distributed database system, such as CASSANDRA, may be used.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association exists. In other words, some connections, relationships or associations between elements may not be shown in the drawings so as not to obscure the invention. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths, as may be needed, to effect the communication.

Referring now to FIG. 1, an illustrative content retrieval system 100 is embodied in a computing device 110. The content retrieval system 100 includes a content and user interaction analyzer 112, which processes electronic content (e.g., content 122, 134, 136) and electronic interactions of a user (e.g., interactions 126, 130) with or relating to electronic content. The content and user interaction analyzer 112 extracts or derives information and associations from the processed content and interactions, and maintains a similarity model 120 based on the extracted or derived information and associations. As described in more detail below, the similarity model 120 can be used (e.g., by a user at a computing device or by an automated process) to find content having a desired type and/or degree of similarity to an input or source content 122. Alternatively or in addition, the similarity model 120 may be used to arrange found content based on a desired type and/or degree of similarity to an input or source content 122. The desired type and/or degree of similarity can be based on the input or source content 122, information obtained from the similarity model 120, and/or user input, for example.

The content retrieval system 100 may be embodied as a stand-alone software application, or may be embedded in or accessed by one or more other applications. For example, all or portions of the content retrieval system 100 may be incorporated into other computing systems or software applications that have a need for a search feature. Such applications or systems may include, for example: operating systems, web browsers, word processing software, electronic mail systems, social networking systems, electronic messaging systems, application-specific content retrieval systems, and web- or mobile device-based applications for trip or vacation planning, online shopping, research, newsgathering, entertainment, music and/or video sharing, and/or others. Further, the content retrieval system 100 may be local to a particular computing device 110 or may be distributed across multiple computing devices 110. Illustrative embodiments of the content retrieval system 100 and the computing device 110 are described below with reference to FIG. 6.

The illustrative content and user interaction analyzer 112 is embodied as a computerized module that includes one or more computer-executable instructions configured to interface with electronic content (e.g., content 122, 134, 136) and/or user interactions with or relating to electronic content (e.g., interactions 126, 130) to create, update, and maintain the similarity model 120. In some embodiments, the content and user interaction analyzer 112 operates in an automated fashion (e.g., on a continuous, ongoing basis, such as a background process) to analyze electronic content as it is created, modified, or accessed. In other embodiments, execution of the content and user interaction analyzer 112 may occur in response to a triggering event (e.g., a user command, the occurrence of an event, or the elapse of a specified amount of time).

As described in more detail below with reference to FIG. 3, the content and user interaction analyzer 112 processes electronic content (e.g., content 122, 134, 136) to extract or derive therefrom one or more pieces of content embodied in the content and/or one or more attributes (e.g., name, author, file type, file size, date created, etc.) of the content. Based on the extracted or derived information, the content and user interaction analyzer 112 associates textual elements with the content, associates the analyzed content with one or more clusters in the similarity model 120, and updates the similarity model 120 with information relating to the textual elements and clusters associated with the processed content.

Some examples of electronic content that may be processed by the content and user interaction analyzer 112 include text strings (such as a search request, query, or search term), electronic mail messages; calendar, task list, or notepad entries; electronic files of any file type (e.g., word processing documents, presentation slides, spreadsheets, graphics, images, thumbnails, sound, music, and audiovisual files), portions or combinations of any of the foregoing and/or others. Some examples of pieces of content that may be extracted from the content include words, phrases, clauses, symbols, paragraphs, equations, formulas, sequences of numbers, text blocks, sections, headers, images, graphics, charts, tables, graphs, and/or spreadsheets, portions or combinations of any of the foregoing and/or others. Some examples of textual elements that may be associated with the content include keywords, meta tags (e.g., HyperText Markup Language (HTML) or Extensible Markup Language (XML) tags), text tokens, semantic information, vectors, portions or combinations of any of the foregoing and/or others.

As shown in FIG. 1, electronic content processed by the content and user interaction analyzer 112 may be associated with a search realm 118. The illustrative search realm 118 includes un-analyzed content 134 (e.g., content that has not been processed by the content and user interaction analyzer 112), and analyzed content 136 (e.g., content that has been processed by the content and user interaction analyzer 112).

In general, the electronic content 134, 136 associated with the search realm 118 includes one or more electronically-retrievable documents, data or information elements, such as word processing documents, spreadsheets, presentation slides, text, image, audio, audiovisual, or multimedia files; web pages, electronic messages, attachments to electronic messages, calendar events, address book entries, task list entries, notes, comments, and individual pieces of content or information stored in any location that is accessible to the content retrieval system 100; including, for example, private, shared, or public sources, services, applications, databases, document management systems, contact management systems and/or customer relationship management (CRM) systems, portions or combinations of any of the foregoing, and/or others. Some examples of private sources include electronic files, folders, and directories, which may be located on a personal computing device (e.g., a smart phone, personal digital assistant, laptop, tablet, or desktop computer). Some examples of shared sources include electronic messages that are sent to other users (e.g., through an electronic mail or social networking application), and electronic files or other information to which a limited group of other users has access (e.g., via a group folder, intranet, or enterprise system). Some examples of public sources include electronic files, blogs, web pages, comments, status updates and messages to which access is not restricted.

In some embodiments, the electronic content 134, 136 may include user-specific content and/or non-user specific content. Some examples of user-specific content include information created by or about the user and/or the user's interactions with electronic content that is accessible to the user through one or more computing devices. Such information and/or interactions may include, for example: documents, data, text, image, audio and video files, presentation slides or files, spreadsheets, electronic messages, email attachments, address book and calendar entries and the like; as well as records of information pertaining to the user's online or local computing activity, search queries, search results, web sites visited and/or bookmarked, online or local computer applications or services subscribed to (e.g., RSS feeds, TWITTER follows, automated alert services, etc.), user-specific configuration data or preferences (e.g., travel or dining preferences, music styles, etc.), application-specific user information (e.g., employment status or history, subjects or topics of interest, privacy settings, etc.), files, messages, address book entries and/or calendar events created, viewed, opened, modified, sent, forwarded, replied to or deleted; electronic bookmarks, notes, comments, reminders, task lists, portions or combinations of any of the foregoing and/or others.

Some examples of non-user specific content include information that is publicly available on the Internet or through Internet-based applications or other networked or online services, such as: documents; text, graphic, image, video, sound or music files, news articles, educational information, maps, address and/or phone directories, geographic information such as time zones, zip codes, and currency conversions; and catalogs or product or service descriptions, as well as reference data such as public dictionaries or thesauruses (e.g., DICTIONARY.COM), domain-specific dictionaries and/or ontologies (e.g. medical, legal, or scientific dictionaries and/or ontologies), public knowledge bases (such as WIKIPEDIA), lists of search terms that are most frequently used by a population of users, rankings of electronic content that has been most frequently or most recently accessed by a population of users, portions or combinations of any of the foregoing and/or others.

Figure 6:
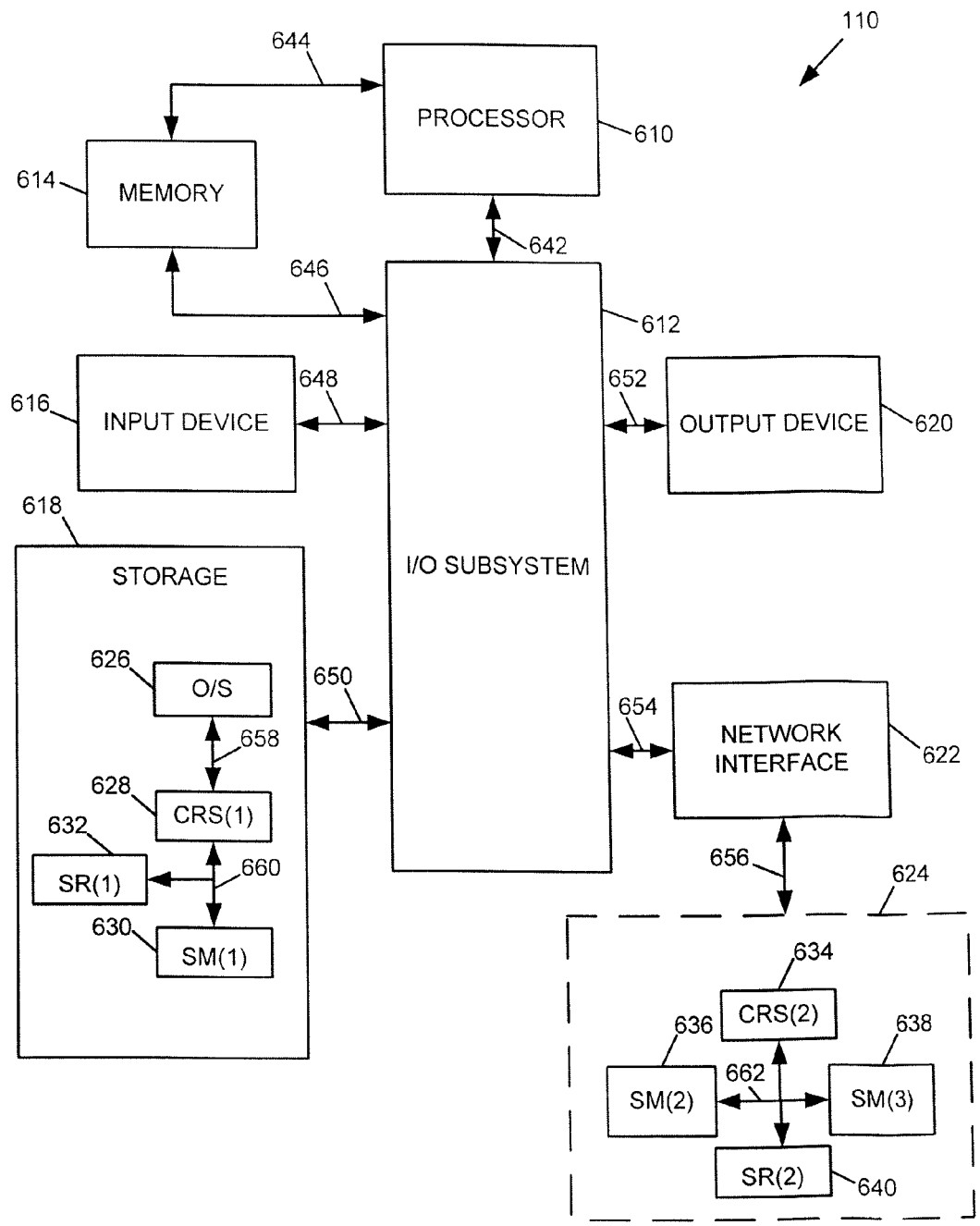
FIG. 6 is a simplified block diagram of at least one embodiment of a computing environment in connection with which the content retrieval system of FIG. 1 may be implemented.

As illustrated in FIG. 6 and described further below, all or portions of the search realm 118 may be stored on a local computing device, a remote computing device (e.g. one or more physical or logical servers or storage devices configured to provide storage for multiple users), an Internet site (e.g. a server hosting a web page or web-based application), and/or other suitable locations depending on the type and/or characteristics of the particular search realm 118.

The content and user interaction analyzer 112 interfaces with the search realm 118 to process electronic content as described herein and update the similarity model 120 according to the results of the content processing. The illustrative similarity model 120 is embodied as a database or other suitable data structure configured to store information resulting from the processing conducted by the content and user interaction analyzer 112. Some examples of information that may be generated by the content and user interaction analyzer 112 and stored in the similarity model 120 include textual elements that are added to or associated with processed content (e.g., keywords, topics, sub-topics, text tokens, vectors, annotations, and/or others), associations of topics and/or sub-topics with other topics, sub-topics, and/or content; indexes, information about relationships or associations between or among textual elements, and information about relationships or associations among the various pieces of electronic content and user interactions with or relating to electronic content. The similarity model 120 also stores weights and scores that are determined or calculated and assigned by the content and user interaction analyzer 112 to the various textual elements, topics, sub-topics, content and/or other information associated with the processed electronic content, as described below with references to FIGS. 3-5. The illustrative similarity model 120 is described in more detail below with reference to FIG. 2.

In some embodiments, the similarity model 120 may include a user-specific profile 138. The illustrative user-specific profile 138 is embodied as part of the similarity model 120 and may be embodied as a database or other suitable data structure that stores information about a particular user or users of the content retrieval system 100, user-specific content, and/or user interactions with or relating to electronic content. Some examples of information that may be stored in the user-specific profile 138 include textual elements, associations of topics and/or sub-topics with other topics, sub-topics, and/or content; indexes, information about relationships or associations between or among textual elements, and information about relationships or associations among various pieces of user-specific information, content and/or interactions. In some embodiments, the user-specific profile 138 may include one or more of the features described in U.S. patent application Ser. No. 13/149,536, filed May 31, 2011, entitled "Method and Apparatus for User Modelization," and/or one or more of the features described in U.S. patent application Ser. No. 13/298,374, filed Nov. 17, 2011, entitled "Method and System Utilizing a Personalized User Model to Develop a Search Request," both of which are incorporated herein by this reference in their entirety.

Referring still to FIG. 1, the content retrieval system 100 also includes a similar content finder 114 and a found content analyzer 116. The illustrative similar content finder 114 is embodied as a computerized module that includes one or more computer-executable instructions configured to formulate and execute a computer-executable query to search for electronic content in the search realm 118 having a desired type and/or degree of similarity with the input or source content 122, based on information associated with the input or source content 122, information obtained from the similarity model 120, and/or other input from a user (e.g., interactions 126, 130). Typically, the computer-executable query includes Boolean operators and may include semantic data and/or other search terms corresponding to one or more attributes or textual elements associated with the input or source content 122. The similar content finder 114 returns one or more pieces of electronic content retrieved from the search realm 118, or no results, in response to the execution of the computer-executable query. The illustrative similar content finder 114 is described in more detail below with reference to FIG. 4.

The illustrative found content analyzer 116 is embodied as a computerized module that includes one or more computer-executable instructions configured to analyze the electronic content retrieved by the similar content finder 114 and arrange the found content according to its relative proximity to the input or source content 122 according to a desired type and/or degree of similarity. The desired type and/or degree of similarity can be determined or modified as a result of user input (e.g., interactions 126, 130) and/or information obtained from the similarity model 120. The found content (e.g., content 132), if any, may be arranged and presented to the user in any suitable form, visual or otherwise, such as a list, table, or matrix of data, hyperlinks, text, image, audio output, audiovisual files, thumbnail files, and/or other items, and/or portions or combinations of any of the foregoing. The illustrative found content analyzer 116 is described in more detail below with reference to FIG. 5.

As indicated by the bidirectional arrows 140, 142, 144, 146, 148, 150, 152, 154, 156, 158, 160, each or any of the processes described herein may be iterative in nature. For example, in some embodiments, a user may enter a search request (e.g., one or more search terms, keywords, or other pieces of content) as the input or source content 122 and then modify the search request or create a new search request based on results found by the similar content finder 114. Likewise, the similar content finder 114 may allow the user an opportunity to specify, modify or clarify the search request by displaying a number of possible modifications or clarifications 124 of the desired type and/or degree of similarity associated with the search request, and then create or modify the computer-executable query based on the user's response (e.g., interaction 126). In a similar manner, the found content analyzer 116 may allow the user an opportunity to specify, modify, or clarify the desired arrangement of the found content by displaying a number of possible modifications or clarifications 128 relating to the desired type and/or degree of similarity, and then modify the arrangement of the found content based on the user's response (e.g., interaction 130). As another example, the content and user interaction analyzer 112 may monitor a user's electronic interactions with or relating to the found content (e.g., found content 132), and then update the similarity model 120 based on the user's interactions and/or interface with the found content analyzer 116 to re-arrange the found content in response to the user's interactions. Additionally, the content and user interaction analyzer 112, similar content finder 114 and/or the found content analyzer 116 may interface with the similarity model 120 to update weights, scores, textual elements, associations or other information, at any time during operation of the content retrieval system 100. In these and other ways, the content retrieval system 100 can continuously learn new information that may relate to the desired type and/or degree of similarity with respect to a given input or source content 122. As a result, through continuous interfacing with the similarity model 120, the content retrieval system 100 can adapt and improve its ability to find electronic content having a desired similarity to an input or source content over time (e.g., as content or user preferences change).

In the illustrative example of FIG. 1, an input or source content 122 is received by or otherwise identified to the content retrieval system 100 as being electronic content for which other content having a desired type and/or degree of similarity to the input or source content 122 is sought. The input or source content 122 may include an alphanumeric string, a document, an image, a graphic, or virtually any other type of electronic content, and/or a portion or combination of any of the foregoing. The input or source content 122 may or may not have already been processed by the content and user interaction analyzer 112. If the input or source content 122 has not previously been processed by the content and user interaction analyzer 112, then it may be processed by the content and user interaction analyzer 112.

Using the results of processing of the input or source content 122 conducted by the content and user interaction analyzer 112, the content retrieval system 100 may display a number of possible clarifications or modifications 124 of the desired type and/or degree of similarity. The possible clarifications or modifications 124 may relate to one or more similarity metrics (i.e., one or more bases for measuring the type and/or degree of similarity of electronic content to other electronic content). Some exemplary similarity metrics are discussed in greater detail below with reference to FIGS. 2-4.

In this instance, the input or source content 122 may be, for example, a presentation slide that has text, graphics, and formatting (e.g., background color, font size, etc.) embedded therein. The similar content finder 114 may determine, based on the formatting, document type (e.g., ".ppt"), or the presence of graphics in the input or source content 122; or based on other attributes or textual elements added to or associated with the input or source content 122 or other information obtained from the similarity model 120, that electronic content having a similar layout (but not necessarily similar textual content) is sought. Alternatively or in addition, the similar content finder 114 may have learned from the similarity model 120 that the user has created two new versions of the input or source content 122 within the last several days, and therefore determine that content having similar words, layout, and graphics is the degree of similarity that is sought. To illustrate further, the similar content finder 114 may determine, based on attributes and/or textual elements added to or associated with the input or source content 122, or based on information in the similarity model 120, or based on interactions of a user with electronic content, that the desired type and/or degree of similarity relates to the layout of the input or source content 122, or that a lesser or greater degree of similarity, or that a different type of similarity, is likely desired.

In some embodiments, the similar content finder 114 may automatically proceed to generate a computer-executable query to search for electronic content having a similar layout (but not necessarily similar words or graphics) to the input or source content 122; or to search for electronic content having similar words, similar layout, and similar graphics, as the case may be. However, in the illustrated example, the user is prompted for a possible clarification or modification 124 and the user selects "layout." The similar content finder 114 then executes a computer-executable query formulated to weight "layout" higher than other similarity metrics.

Next, the found content analyzer 116 analyzes the results of the executed query and arranges the found content based on the similarity of each found content's layout to the layout of the input or source content 122. Additionally, the found content analyzer 116 may evaluate the similarity of the found content to the input or source content 122 based on one or more of, or all of, the other similarity metrics associated with the input or source content 122. For example, based on the weights associated with the various similarity metrics, found content having similar layout, text, and graphics may be ranked higher or lower than found content having only similar layout.

In some embodiments, the found content analyzer 116 may automatically proceed to arrange and output the found content (e.g., as a list of search results). In the illustrative example, however, the user is prompted for a possible clarification or modification 128 of the desired type and/or degree of similarity. In the illustrative example, the found content analyzer 116 may, after having learned from user input that layout is an important similarity metric (for at least the current search), display possible modifications or clarifications that may be related to the layout, and the user may select "color scheme." The found content analyzer 116 then groups the found content; ranking found content that has both similar layout and similar color scheme to the input or source content 122 higher than found content that has only a similar layout, and higher than found content that has a similar layout and similar graphics but not a similar color scheme.

Figure 2:
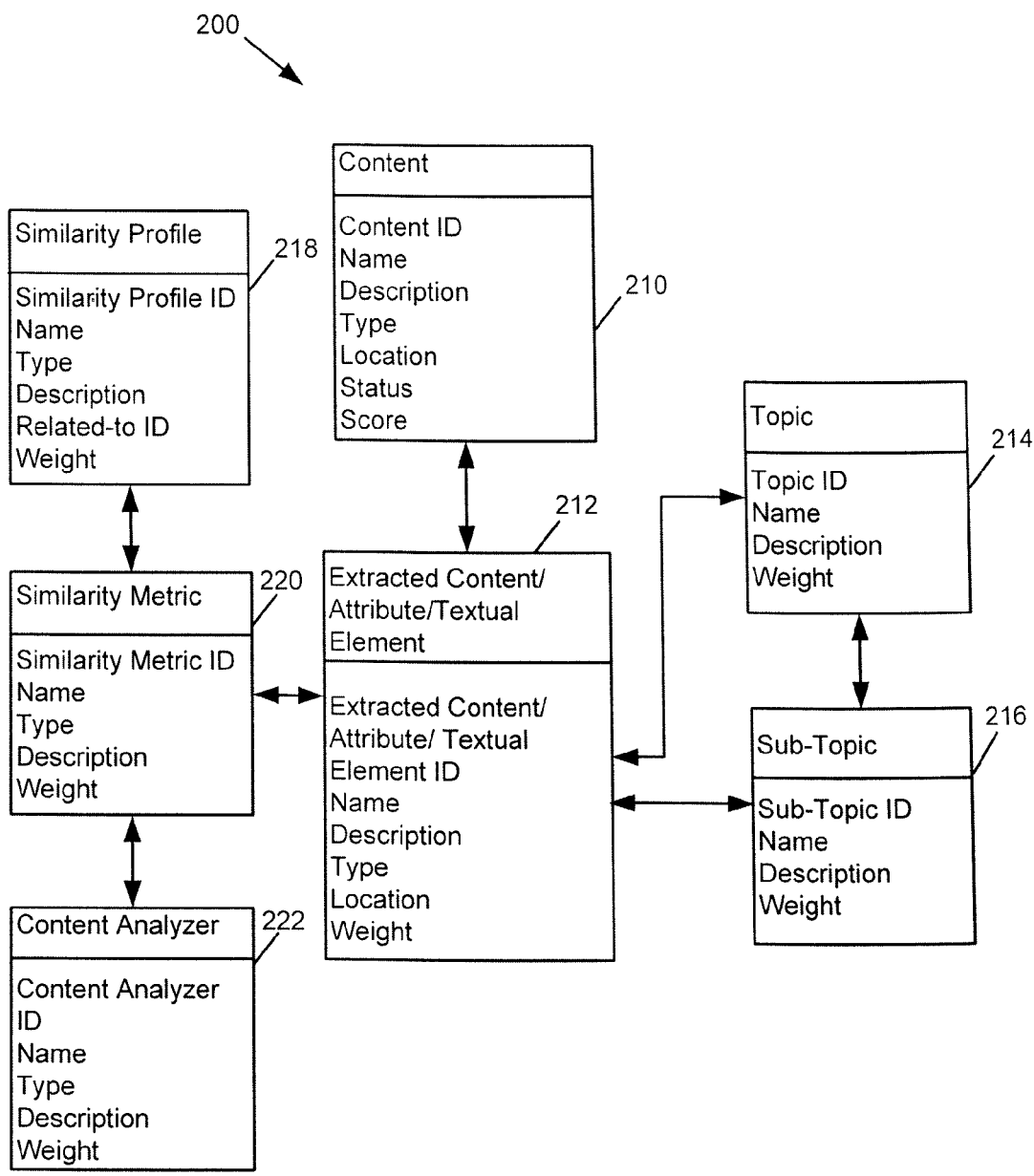
FIG. 2 is a simplified data model for at least one embodiment of a database that may be used in connection with the content retrieval system of FIG. 1.

Referring now to FIG. 2, an illustrative data model diagram 200 for the similarity model 120 is shown. According to the data model diagram 200, the similarity model 120 stores and maintains content data objects 210; extracted content, attribute, or textual element data objects 212, topic data objects 214, sub-topic data objects 216, similarity profile data objects 218, similarity metric data objects 220, content analyzer data objects 222, and relationships among the data objects 210, 212, 214, 216, 218, 220, 222, represented by bidirectional arrows.

The illustrative content data object 210 stores information about electronic content that has been processed by the content and user interaction analyzer 112; for example, a unique content identifier, a content name (e.g., a file name), a description of the content, a content type (e.g., a document type), a location (e.g., a folder or directory on a computing device), a status (e.g., analyzed or un-analyzed), and a score (e.g., a proximity score relative to an input or source content 122).

The illustrative extracted content/attribute/textual element data object 212 stores information about each piece of content extracted from a content 210, attributes associated with the content 210, and textual elements added to the content 210 by the content and user interaction analyzer 112. For example, the extracted content/attribute/textual element data object 212 stores a unique extracted content/attribute/textual element identifier, name, description, type (e.g., extraction, attribute, or textual element), location (e.g., link or name of a folder or directory on a computing device), and weight (indicating, e.g., the importance of the extracted content, attribute or textual element 212 relative to other extracted content, attributes or textual elements 212 associated with the content 210).

The illustrative topic data object 214 and sub-topic data object 216 each include information relating to words that describe or indicate higher-level concepts and/or associations or relationships among the extracted content, attribute, and/or textual element data objects 212, as determined by the content and user interaction analyzer 112. For example, based on its analysis of a content 210, the content and user interaction analyzer 112 may associate an extracted image of a person sitting at computer with a topic called "computer" and also with a sub-topic of the "computer" topic called "personnel."

However, based on its analysis of another content 210, the content and user interaction analyzer 112 may associate the same image with a topic called "workplace" and a sub-topic called "telecommuting." In the illustrated example, the topic data object 214 and the sub-topic data object 216 store a unique topic or sub-topic identifier (as the case may be), name, description, and weight (indicating, e.g., the importance of the topic or sub-topic relative to other topics or sub-topics associated with an extracted content, attribute or textual element 212 or content 210).

The illustrative similarity profile data object 218 stores information that can be used to link one or more similarity metrics with a particular search situation, such as a specific user or process conducting the search and/or a specific type of input or source content 122. In the illustrated example, the information associated with the similarity profile data object 218 includes a unique similarity profile identifier, name, type of profile (e.g., user and/or content type), description, related-to identifier (e.g., a user name, process identifier, or a file name or file extension associated with a document type), and weight (indicating, e.g., the importance of the similarity profile 218 relative to other similarity profiles 218 associated with a user or content type). As an example, a particular user or process may specify that when searching for electronic mail messages that are similar to an input or source content 122, similarity metrics relating to textual similarity should be weighted higher than similarity metrics relating to visual similarity. The same user or process may specify that when searching for electronic books (or "e-books") that are similar to an input or source content 122, similarity metrics relating to content style (e.g., similar style of writing) should be weighted higher than similarity metrics relating to visual similarity. Other users or processes may define similarity differently in these and/or other contexts, and therefore may have different similarity profiles.

The similarity metric data object 220 stores information about similarity metrics that can be associated with extracted content, attributes or textual elements 212 and/or similarity profiles 218. In the illustrated example, that information includes a unique similarity metric identifier, name, type (indicating, e.g., whether the similarity metric applies to textual or non-textual content), description, and weight (indicating, e.g., the importance of the similarity metric relative to other similarity metrics associated with an extracted content, attribute or textual element 212 or with a content 210). For example, where an extracted content consists of a video or graphic file, a similarity metric relating to visual content similarity may be weighted higher than a similarity metric relating to textual similarity. Similarity metrics may be configured to apply to all or certain instances of content, attributes, and textual elements, or, through the similarity profile 218, may be tailored according to the preferences associated with specific users or automated processes.

As described in more detail below with reference to FIG. 3, the illustrative content analyzers (e.g., analyzers 322, 324, 326, 328, 330, 332, 334, 336, 338, 340, 342) are embodied as computerized modules executable by the content and user interaction analyzer 112 to process electronic content in accordance with one or more similarity metrics. The content analyzer data object 222 includes data that can be used to associate one or more content analyzers with one or more similarity metrics. In the illustrated example, that data includes a unique content analyzer identifier, name, type (indicating, e.g., on what type of content the analyzer can be used, such as graphics, images, URLs, words, or phrases), description, and weight (indicating, e.g., the importance of the content analyzer 222 relative to other content analyzers associated with a similarity metric 220). As an example, if an extracted content includes a grammatical clause or phrase, a similarity metric that is directed to measuring the similarity of the text (e.g., the words or sequences of words) may be applied. There may be multiple different content analyzers associated with the "similar text" similarity metric; for example, a most important words analyzer (e.g., analyzer 322), a semantic analyzer (e.g., analyzer 326), and a vector analyzer (e.g., analyzer 342). These content analyzers may be weighted differently for the extracted clause or phrase than they would be for an extracted keyword, attribute, or textual element, in some instances. For example, a vector analyzer may be weighted higher than a most important words analyzer for analysis of extracted clauses or phrases.

In the illustrative embodiment, the bidirectional arrows shown in FIG. 2 are used to indicate many-to-many relationships among the data objects. For example, a piece of content 210 may be related to one or more extracted content/attribute/textual element data objects 212. That is, a content 210 may have one or more pieces of content extracted or derived therefrom, or one or more attributes, or one or more textual elements associated therewith. Similarly, an extracted piece of content, attribute or textual element may be associated with one or more content data objects 210 (e.g., the same graphic or keyword may occur in multiple documents). An extracted content, attribute, or textual element 212 can be associated with many different topics 214, sub-topics 216, and/or similarity metrics 220, and vice versa. Likewise, a similarity metric 220 can be associated with many different instances of extracted content, attributes, or textual elements 212; many different similarity profiles 218, and/or many different content analyzers 222, and vice versa. Also, a topic 214 may have multiple sub-topics 216 associated with it, and a sub-topic 216 may be associated with multiple topics 214. It should be understood, however, that one-to-many and/or one-to-one relationships between the data objects 210, 212, 214, 216, 218, 220, 222 may be used, alternatively or in addition to many-to-many relationships, in some embodiments.

Figure 3:
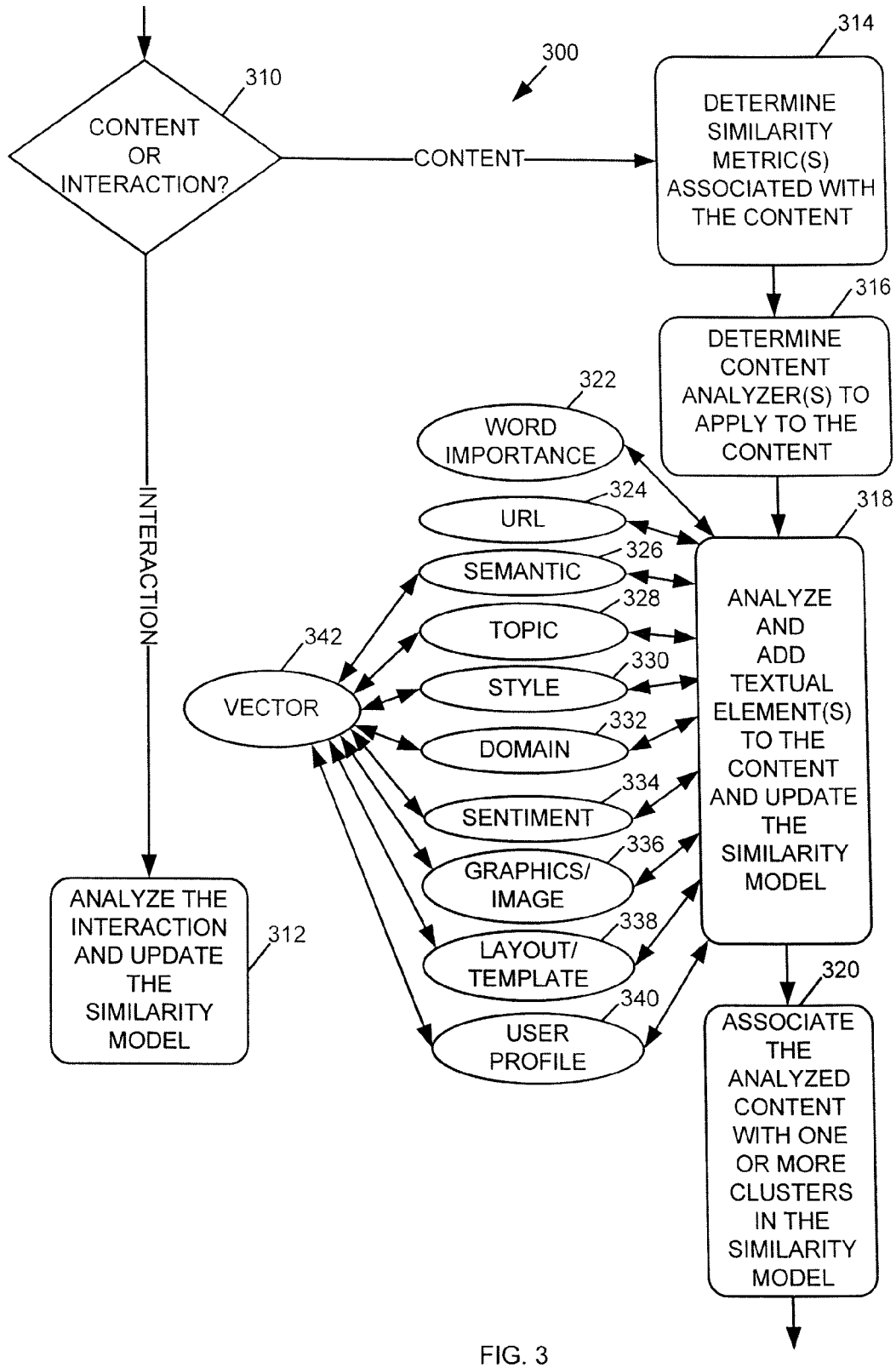
FIG. 3 is a simplified flow diagram of at least one embodiment of a method for analyzing content.

Referring now to FIG. 3, an illustrative method 300 executable by the content and user interaction analyzer 112 to analyze electronic content is shown. At block 310, the method 300 determines whether electronic content identified to the content and user interaction analyzer 112 (e.g., content 122, 134, 136) is content to be processed by one or more of the content analyzers 322, 324, 326, 328, 330, 332, 334, 336, 338, 340, 342, or whether it relates to a user's electronic interaction with or relating to content (e.g., selecting and/or opening a found document at a computing device).

If the electronic content identified to the content and user interaction analyzer 112 relates to a user interaction, then at block 312, the interaction is analyzed and the similarity model 120 is updated as needed. For example, depending on the nature of the user's interaction with the content, one or more of the weights associated with the data objects 212, 214, 216, 218, 220, 222 may be adjusted higher or lower. The user's interaction may be explicit (e.g., clicking on a "like," "thumbs up," or "thumbs down" icon) or implicit (e.g., the user opens a document ranked third on a list of found content but does not open a document ranked first on the list). In either case, information relating to the user's interaction is captured by the content and user interaction analyzer 112 and may be used to update the similarity model 120.

If the electronic content (e.g., content 122, 134, 136) identified to the content and user interaction analyzer 112 is to be processed by one or more of the content analyzers 322, 324, 326, 328, 330, 332, 334, 336, 338, 340, 342, then at block 314, the method 300 determines which of the one or more similarity metrics are associated with the content. Some examples of similarity metrics include: a textual similarity metric (measuring the similarity of words in a piece of content to those in an input or source content); a content similarity metric (measuring the similarity of concepts or topics to which a piece of content is related compared to those related to an input or source content); an overall visual similarity metric (measuring the similarity of the layout, color, font, paragraph structure, etc. of a piece of content to those of an input or source content); a specific visual similarity metric (measuring the similarity of a specific piece of visual content (e.g., a graphic or image) to an input or source content); a content type similarity metric (measuring the similarity of the type of content (e.g., legal, medical, technical, entertainment, opinion, news, etc.) to an input or source content); a content style similarity metric (measuring the similarity of the writing style of content to an input or source content); and a content sentiment similarity metric (measuring the relative polarity (e.g., positive, negative, or neutral) of a content relative to an input or source content).

The similarity metric(s) associated with an electronic content may be determined based on, for example, one or more attributes of the content. For example, if the content is a word processing document in which tables and graphs are embedded, then both a textual similarity metric and a visual similarity metric may be associated with the content. In some embodiments, all of the available similarity metrics may be associated with the content irrespective of its attributes or other factors, in which case, block 314 can be skipped.

At block 316, a determination is made as to whether all or a subset of the available content analyzers (e.g., 322, 324, 326, 328, 330, 332, 334, 336, 338, 340, 342) are to be applied to the electronic content. In some embodiments, only those content analyzers associated with a particular similarity metric, or only certain of the content analyzers associated with a particular similarity metric, may be applied to the content. For example, a text document may be associated with a content similarity metric. The content similarity metric may have multiple different content analyzers associated with it; such as a most important words analyzer (e.g., analyzer 322), a semantic analyzer (e.g., analyzer 326), a topic analyzer (e.g., analyzer 328), and a vector analyzer (e.g., analyzer 342). Based on one or more attributes of the content and/or information in the similarity model 120 (e.g., user preferences, weights, etc.), the method 300 may determine that the semantic analyzer 326 but not the vector analyzer 342 should be applied to the content. In other embodiments, all of the available content analyzers may be applied to the content irrespective of its attributes, associated similarity metrics, or other factors, in which case, block 316 can be skipped.

At block 318, the electronic content identified to the content and user interaction analyzer 112 is analyzed using all or selected ones of the available content analyzers 322, 324, 326, 328, 330, 332, 334, 336, 338, 340, 342. At block 318, individual pieces of content and/or attributes are extracted or derived and analyzed, and one or more textual elements (e.g., keywords, topics, sub-topics, text tokens, vectors, annotations, etc.) are added to or associated with the content by the selected content analyzers 322, 324, 326, 328, 330, 332, 334, 336, 338, 340, 342.

In some embodiments, a word importance analyzer 322 may be applied to the content. The illustrative word importance analyzer 322 is embodied as a computerized module comprising one or more computer instructions configured to determine which of the textual elements added to or associated with a content comprise one or more words that appear to be the most important, most popular, most frequently used, and/or most recently used words associated with the content. In some embodiments, the word importance analyzer 322 uses one or more statistical or probabilistic analytical tools or techniques, such as a combination of term frequency and inverse document frequency (e.g., a modified tf-idf algorithm), to create and continuously update an index of words that appear to be most important in the content and/or in the similarity model 120. In some embodiments, the word importance analyzer 322 extracts the most important words from the content, adds or associates one or more textual elements with the content, and updates the similarity model 120 with information associated with the most important words, so that other content containing one or more of the most important words may be determined to have a desired similarity with the content.

In some embodiments, a URL analyzer 324 may be applied to the content. The illustrative URL analyzer 324 is embodied as a computerized module comprising one or more computer instructions configured to identify any Uniform Resource Locators in the content and to follow the link associated with each URL. Any additional content associated with each followed link is analyzed in the same manner as the original content, as described herein.

In some embodiments, a semantic analyzer 326 may be applied to the content. The illustrative semantic analyzer 326 is embodied as a computerized module comprising one or more computer instructions configured to extract or derive semantic information from the electronic content and add or associate one or more textual elements with the content based on the semantic information. For purposes of this disclosure, the term "semantic information" is intended to include, without limitation, any information relating to the underlying meaning or meanings of a particular piece of content and/or relationships between the content and its one or more underlying meanings. For example, in some embodiments, semantic information relating to content may include one or more categories of information (e.g., name, date, location, phone number, etc.); specific instances of information associated with the categories of information (e.g., proper nouns); and relationships between the categories and instances of information. As an example, for a given piece of content containing the word "Jackson" (or having a textual element "Jackson" associated therewith), a semantic relationship might be "last name: Jackson," while for another piece of content, the relationship might be "first name: Jackson" or "company name: Jackson." Alternatively or in addition, multiple relationships may be associated with content, with each relationship being assigned a weight according to its likelihood of being the correct or intended one. For example, for a given piece of content, a relationship of "Jackson: first name" might be weighted higher than a relationship of "Jackson: last name," while the opposite might be true for a different piece of content.

Generally speaking, the semantic analyzer 326 processes electronic content to determine semantic information (e.g., semantic categories, instances, and/or relationships) associated with the electronic content using one or more semantic analysis techniques. In some embodiments, the semantic analyzer 326 may process electronic content using one or more of the semantic analysis techniques described in U.S. patent application Ser. No. 13/149,319, filed May 31, 2011, entitled "Method and Apparatus for Performing Semantic-Based Analysis," which is incorporated herein by this reference in its entirety. The semantic analyzer 326 may also access the similarity model 120 (including the user-specific profile 138) to determine semantic information that may be appropriate to associate with the content and add or associate one or more textual elements with the content based on semantic information from the similarity model 120.

In some embodiments, a topic analyzer 328 may be applied to the content. The illustrative topic analyzer 328 is embodied as a computerized module comprising one or more computer instructions configured to analyze semantic information and/or other attributes or textual elements associated with the content, and create or associate topics and/or sub-topics with the content. In some embodiments, the topics and/or sub-topics may be obtained or derived from user-specific sources (such as the user-specific profile 138) and/or public sources, such as dictionaries or thesauruses (e.g., DICTIONARY-.COM), domain-specific dictionaries and/or ontologies (e.g. medical, legal, or scientific dictionaries and/or ontologies), public knowledge bases (such as WIKIPEDIA), lists of search terms that are most frequently used by a population of users, and/or rankings of online content that have been most frequently or most recently accessed by a population of users. The topics and/or sub-topics are stored in the similarity model 120, and may include descriptions, connotations, contexts, and/or higher-level concepts or abstractions that represent associations among extracted content, attributes, and/or textual elements (e.g., semantic information) that appear to have some relationship with one another based on, for example, their use, proximity and/or frequency of occurrence in the content and/or the similarity model 120. The topic analyzer 328 may also assign weights to the various topics and sub-topics, based on, for example, frequency or recency of access or use of the content.

In some embodiments, a style analyzer 330 may be applied to the content. The illustrative style analyzer 330 is embodied as a computerized module comprising one or more computer instructions configured to analyze the style of writing of content, including, for example, the language used (e.g., English, French, Chinese, etc.), the average length of sentences and/or paragraphs, the number of different words used, the relative frequency of similar words, the number of words of a particular part of speech used (e.g., nouns, verbs, adjectives, etc.), most common terms, the types and/or frequency of punctuation, abbreviations, acronyms, typographical errors, uncommon terms, the types and/or frequency of use of different sentence types (e.g., declarative, interrogative, imperative, exclamatory, simple, compound or complex), a portion or combination of any of the foregoing, and/or other factors. The style analyzer 330 extracts or derives grammatically significant groups or combinations of words that appear together or in close proximity (e.g., phrases, clauses, sentences, paragraphs, etc.) from the content and conducts a most important words analysis (using, e.g., the word importance analyzer 322 described above) and/or a vector analysis (using, e.g., the vector analyzer 342 described below) to associate the extracted or derived content with one or more styles of writing. The style analyzer 330 adds or associates one or more textual elements with the content with information associated with the one or more styles of writing determined to be associated with the content. The style analyzer 330 may also access the similarity model 120 to determine writing style information that may be appropriate to associate with the content and add or associate one or more textual elements with the content based on writing style information from the similarity model 120.

In some embodiments, a domain analyzer 332 may be applied to the content. The illustrative domain analyzer 332 is embodied as a computerized module comprising one or more computer instructions configured to determine one or more specific subject matter domains (e.g., legal, medical, technical/electrical, technical/mechanical, etc.) associated with the content. The domain analyzer 332 extracts or derives words or combinations of words that appear to have a specialized meaning (e.g., proper nouns or uncommon phrases) from the content and conducts a most important words analysis (using, e.g., the word importance analyzer 322 described above) and/or a vector analysis (using, e.g., the vector analyzer 342 described below) to associate the extracted or derived content with one or more subject matter domains. The domain analyzer 332 adds or associates one or more textual elements with the content based on information associated with the one or more subject matter domains determined to be associated with the content. The domain analyzer 332 may also access the similarity model 120 to determine subject matter domain information that may be appropriate to associate with the content and add or associate one or more textual elements with the content based on subject matter domain information from the similarity model 120.

In some embodiments, a sentiment analyzer 334 may be applied to the content. The illustrative sentiment analyzer 334 is embodied as a computerized module comprising one or more computer instructions configured to analyze the overall sentiment of content, including, for example, whether the content is an opinion piece or an analysis, and if an opinion, the type and/or degree of polarity (e.g., strongly negative, mildly negative, neutral, mildly positive, or strongly positive, emphatic, or critical). The sentiment analyzer 334 extracts or derives grammatically significant groups or combinations of words that appear together or in close proximity (e.g., phrases, clauses, sentences, paragraphs, etc.) from the content and conducts a most important words analysis (using, e.g., the word importance analyzer 322 described above) and/or a vector analysis (using, e.g., the vector analyzer 342 described below) to associate the extracted or derived content with a type and/or degree of sentiment. The sentiment analyzer 334 adds or associates one or more textual elements with the content based on information associated with the type and/or degree of sentiment determined to be associated with the content. The sentiment analyzer 334 may also access the similarity model 120 to determine sentiment information that may be appropriate to associate with the content and add or associate one or more textual elements with the content based on sentiment information from the similarity model 120.

In some embodiments, a vector analyzer 342 may be applied to the content. The illustrative vector analyzer 342 is embodied as a computerized module comprising one or more computer instructions configured to extract or derive words, alphanumeric strings, and/or grammatically significant parts of speech (e.g., groups or combinations of words) that appear together or in close proximity (e.g., phrases, clauses, sentences, paragraphs, etc.) from the content, and convert them to numerical vectors. In the illustrated embodiment, each vector is a sequence of digits of length N, where N is a positive integer. Each digit has a value that comprises a positive integer (ranging, e.g., from 0 to 9), and each digit has a position in the vector, also represented by a positive integer. Each digit (e.g., the combination of its position in the vector and its value) is associated with a specified meaning. All of the vectors generated for the content are then processed using a mathematical or arithmetic function (e.g., addition), and the resulting vector (or list or array of vectors) is added as a textual element to the content. In this way, a vector or combination of vectors associated with content can be compared with corresponding vectors associated with other content to determine whether there is a desired type and/or degree of similarity between the pieces of content.

For example, a paragraph describing a hotel's amenities may be extracted from content that includes a structured web page from a trip planning web site. The web page may include a paragraph indicating that a hotel has rooms available that have a queen size bed with free wireless Internet service, no swimming pool, and a complimentary continental breakfast. The extracted paragraph may be converted to a vector 1101, where the first digit position in the vector represents bed information, the second position represents wireless access information, the third position represents swimming pool information, and the fourth position represents breakfast information. For bed information, the following digit values may be available: {0=full, 1=queen, 2=king, 3=California king}. Thus, the illustrative vector, which has the value 1 in position 1, indicates that the available hotel room has a queen bed. Similarly, the available values for wireless access may be {0=no, 1=yes}; thus, the illustrative vector having a value of 1 in position 2 indicates that the available hotel room has wireless access. Likewise, the available values for swimming pool information may be {0=no, 1=yes}, such that the illustrative vector having a value of 0 in position 3 indicates that the hotel does not have a swimming pool. Further, the available values for breakfast information may be {0=coffee, 1=continental, 2=Asian}, such that the illustrative vector having a value of 1 in position 4 indicate that the hotel has a continental breakfast.

Vectors can also be configured to associate digits with specific structures that may be present in the content. For example, patent documents have a specific structure with claims presented as numbered paragraphs at the end of the document, and legal documents often have a specific structure that includes a signature block at the end of the document. A vector can be configured, for example, so that one of its digits is used to represent the presence or absence of a particular type of structure in the content. As an example, a vector digit at a certain position in the vector may have possible values of {0=not a claim, 1=claim}, where the determination of whether the analyzed part of the document is or is not a claim is made, for instance, by whether it begins with a number followed by a period followed by a sentence of a certain length and/or format.

Signature blocks may be analyzed similarly using the vector analyzer 342. For example, position 1 in a vector may represent the presence of a name, position 2 may represent location or title, and position 3 may represent contact information. Thus, if an extracted piece of content has a name followed by a location or title followed by contact information (e.g., phone number, or postal or electronic mail address), its associated vector may be 111, which may be considered by the vector analyzer 342 as having a high degree of likelihood of representing a signature block. In this way, vectors can be used to determine that a content has a particular structure (e.g., a signature block) without regard to the actual contents of the signature block. The signature block vector can then be compared, alone or in combination with other vectors, to corresponding vectors of other content to determine whether there is a desired type and/or degree of similarity between the pieces of content.

As shown in FIG. 3, the vector analyzer 342 can be used in connection with many of the textual content analyzers, including, e.g., the semantic analyzer 326, the topic analyzer 328, the style analyzer 330, the sentiment analyzer 334, and/or the user profile analyzer 340. In general, the vector analyzer 342 may be used whenever sequences or groupings of words, textual tokens, tags, etc., as opposed to individual instances of textual elements (e.g., words, tokens, tags, etc.), are extracted from the content. In some embodiments, the vector analyzer 342 may, alternatively or in addition, be used with one or more of the non-textual content analyzers that transform non-textual information into textual tokens (e.g., the graphics or image analyzer 336 and/or the layout or template analyzer 338, both described below). For example, the graphics or image analyzer 336 may execute the vector analyzer 342 to produce vectors where, e.g., digit 1={0=graphic/image is in black and white, 1=graphic/image is in color}, digit 2={0=graphic/image contains no people, 1=graphic/image contains people}, or may produce vectors including a digit associated with the presence or absence of each color, types of shapes (e.g., square, circle, etc.) in the graphic/image, and/or others. Information relating to associations of vectors with their respective content may be stored in the similarity model 120.

In some embodiments, a graphics or image analyzer 336 may be applied to the content. The illustrative graphics or image analyzer 336 is embodied as a computerized module comprising one or more computer instructions configured to extract or derive graphics and/or images from the content and convert them to textual representation tokens that describe one or more attributes or characteristics of the extracted graphic or image. In the illustrative embodiments, textual representation tokens comprising information relating to the type of graphic or image, its dimensions (e.g. pixels), main color(s), shape, edge positions, and position within the content, may be used. In other embodiments, additional or other types of textual representation tokens may be used. In some embodiments, special software, such as ASPOSE.SLIDES FOR .NET, may be used to extract information from graphics or images and convert the graphics or images to textual representation tokens. The graphics or image analyzer 336 then adds or associates one or more textual elements with the content based on or including the resulting textual representation tokens. The graphics or image analyzer 336 may also access the similarity model 120 to determine graphic or image-related information that may be appropriate to associate with the content and add or associate one or more textual elements with the content based on or including graphics or image textual representation tokens from the similarity model 120.

In some embodiments, a layout or template analyzer 338 may be applied to the content. The illustrative layout or template analyzer 338 is embodied as a computerized module comprising one or more computer instructions configured to extract or derive layout and/or template information (e.g., number of pages, page numbering scheme and position, sections, paragraphs, titles, fonts, styles, indents, bulleted lists, numbered lists, tables, headers, footers, etc., and/or portions or combinations of any of the foregoing) from the content and convert them to textual representation tokens that describe one or more attributes or characteristics of the extracted layout and/or template information. In the illustrative embodiments, textual representation tokens comprising information relating to any of the above-mentioned layout and/or template features, and/or others, may be used, depending on the requirements of a particular design. In other embodiments, additional or other types of textual representation tokens may be used. In some embodiments, special software, such as ASPOSE.EMAIL, ASPOSE.PDF, and/or ASPOSE.WORD may be used to extract layout and/or template information from content and convert the layout and/or template information to textual representation tokens. The layout and/or template analyzer 338 then adds or associates one or more textual elements with the content based on or including the resulting textual representation tokens. The layout and/or template analyzer 338 may also access the similarity model 120 to determine layout and/or template information that may be appropriate to associate with the content and add or associate one or more textual elements based on or including the content with layout and/or template textual representation tokens from the similarity model 120.

In some embodiments, a user profile analyzer 340 may be applied to the content. The illustrative user profile analyzer 340 is embodied as a computerized module comprising one or more computer instructions configured to extract or derive words, alphanumeric strings, and/or grammatically significant groups or combinations of words that appear together or in close proximity (e.g., phrases, clauses, sentences, paragraphs, etc.) from the content and accesses the user-specific profile 138 to determine user-specific meanings, connotations, and/or relationships with other terms that may be appropriate to associate with the content, and adds or associates one or more textual elements with the content based on user-specific information from the user-specific profile 138. For example, in some embodiments, the user-specific profile 138 may be used to determine user-specific meanings of acronyms, abbreviations, proper nouns, and/or other words or groups or combinations of words in the content. In some embodiments, the user profile analyzer 340 may include one or more of the features described in U.S. patent application Ser. No. 13/298,374, filed Nov. 17, 2011, entitled "Method and System Utilizing a Personalized User Model to Develop a Search Request," which, as noted above, is incorporated herein by reference in its entirety.

Once content has been analyzed using any or all of the content analyzers 322, 324, 326, 328, 330, 332, 334, 336, 338, 340, 342, information relating to the textual elements and their associated content may be stored in the similarity model 120. At block 320, the method 300 executes one or more clustering methods to associate the analyzed content with one or more topics or sub-topics defined in the similarity model 120, and/or create one or more new topics or sub-topics, based on the textual elements added or associated with the content at block 318. In the illustrative embodiments, a dynamic clustering method is used to associate the analyzed content with topic/sub-topic cluster(s) in the similarity model. For example, a dynamic clustering method and/or one or more of the clustering tools described in U.S. patent application Ser. No. 13/149,319, filed May 31, 2011, entitled "Method and Apparatus for Performing Semantic-Based Analysis," which, as noted above, is incorporated herein by reference. Some examples of suitable clustering tools include Latent Dirichlet Allocation (LDA), object-oriented programming languages such as LINGO, and linear programming models such as KATZ.

In some embodiments, the content retrieval system 100 may include multiple different clustering tools; in which case the content and user interaction analyzer 112 may execute programming logic to select and use one of the available clustering tools, depending on the particular content type, context, user preferences or feedback, and/or other factors. Following clustering, information relating to the cluster(s) associated with the processed content is stored in the similarity model 120.

Figures 4, 5:
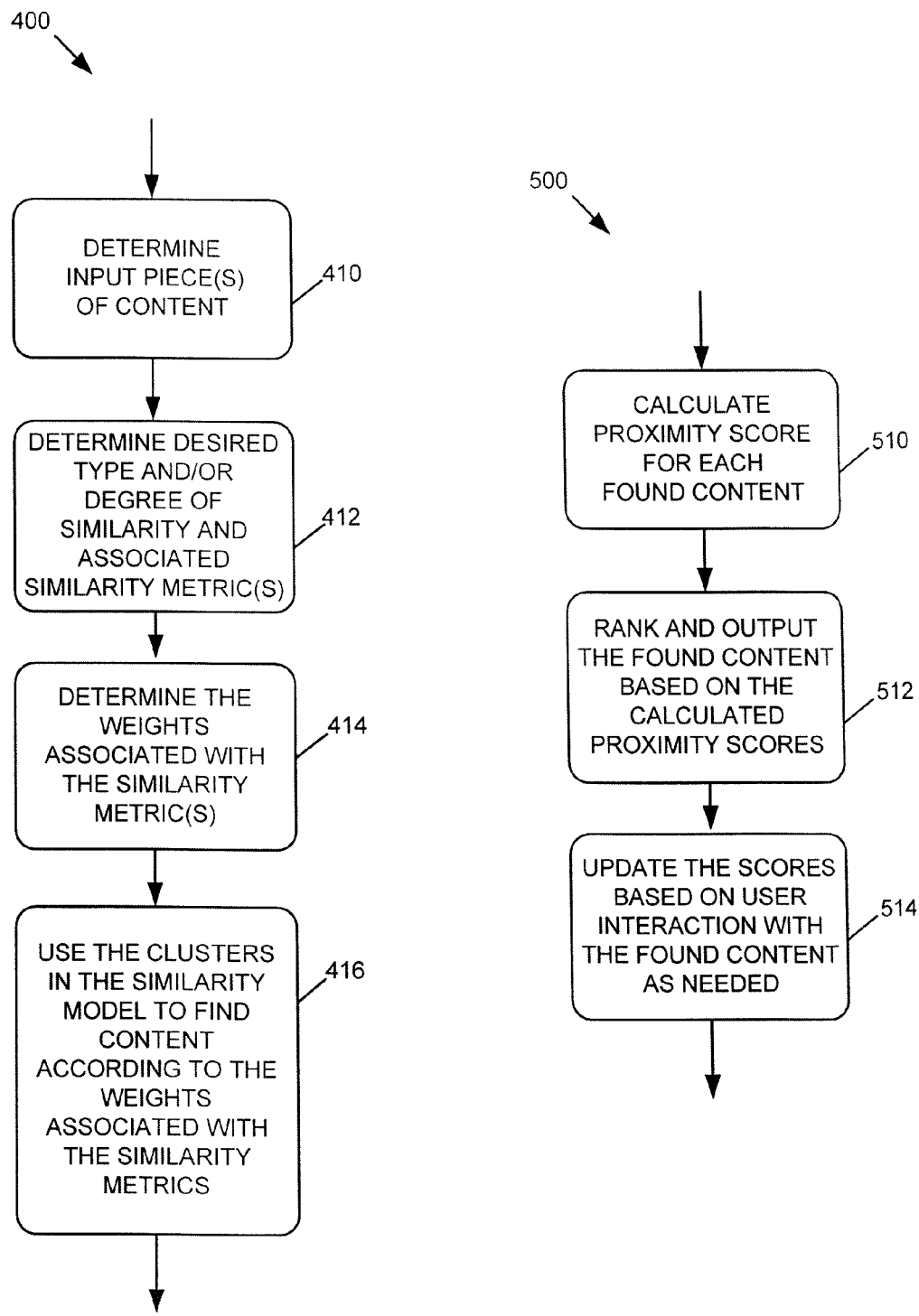
FIG. 4 is a simplified flow diagram of at least one embodiment of a method for finding content.
FIG. 5 is a simplified flow diagram of at least one embodiment of a method for analyzing found content.

Referring now to FIG. 4, an illustrative method 400 executable by the similar content finder 114 is shown. Generally speaking, execution of the method 400 is triggered by a request made (e.g., by a user or an automated process) to find content having a desired type and/or degree of similarity to the input or source content 122. At block 410, the method 400 determines whether the input or source content 122 includes more than one piece of content. If the input or source content 122 includes more than one piece of content, the individual pieces of content are "merged" into a single logical or physical content unit (using, e.g., a concatenation function and/or other techniques including, for example, one or more techniques for removing duplicates, removing non-overlapping pieces of content, or weighting certain of the pieces of content higher than others).

At block 412, the desired type and/or degree of similarity is determined. As described above, this may be an iterative process that may involve one or more interactions with a user and/or accessing of user-specific context information, which may be stored in the user-specific profile 138. Some examples of user-specific context information include a history of the user's most recent searches or interactions with content, information about the user's current geographic location, the current date and time, recent changes in the user's calendar or contact information, recent email activity of the user, and/or others.

If the input or source content 122 has not previously been processed by the content and user interaction analyzer 112, then it is processed by the content and user interaction analyzer 112 to obtain the textual elements, similarity metrics, and clustering information described above. The textual elements, similarity metrics, and clustering information associated with the input or source content 122 are used to determine the desired type and/or degree of similarity sought. In some embodiments, this determination may also be informed by one or more attributes of the input or source content 122, user input (e.g., interaction 126), and/or information obtained from the similarity model 120 (including information from the user-specific profile 138). In some embodiments, a determination is made as to which similarity metric or metrics may be associated with the input or source content 122 (e.g., based on the textual elements and/or clustering information associated with the input or source content 122, user interaction, and/or information in the similarity model 120).

At block 414, the weights associated with the similarity metrics(s) determined at block 412 to be associated with the desired type and/or degree of similarity are determined from the similarity model 120 (e.g., using weights stored in the similarity model 120 as described above with reference to FIG. 2). In some cases, the desired type and/or degree of similarity may be, in fact, a type or degree of dissimilarity, or diversity. In such instances, weights associated with one or more of the relevant similarity metrics may be adjusted downward.

At block 416, the relevant similarity metric(s) and their associated weights are used to identify relevant cluster(s) in the similarity model, and then other content in the search realm 118 and associated with the relevant cluster(s) is identified using a computer-executable query as described above. During searching, the similar content finder 114 looks for content in the search realm 118 that is associated with one or more clusters in the similarity model 120 that are also associated with the input or source content 122.

Referring now to FIG. 5, an illustrative method 500 executable by the found content analyzer 116 is shown. The method 500 is, generally speaking, triggered by the finding, by the similar content finder 114, of content having a desired type and/or degree of similarity to the input or source content 122. At block 510, for each cluster that found content has in common with the input or source content 122, the piece(s) of found content in the cluster are scored based on its proximity to the input or source content 122. A score is calculated for each of the similarity metrics that were applied to the content. In some embodiments, proximity scoring is done using a weighted sum; that is, the proximity scores for all of the relevant similarity metrics are weighted according to the weights associated with the similarity metrics, respectively, and then the weighted scores are added together to yield a total proximity score for the piece of content as it relates to the input or source content 122. In some embodiments, the proximity score may be computed as a measure of perceived strength of association (e.g., the confidence level or strength of belief that the found content is similar to the input or source content 122) using statistical measures including probabilities, proximity measures, and/or other techniques.

At block 512, each cluster and/or the found content in each cluster associated with the input or source content 122 is ranked based on the calculated proximity scores. As mentioned above, this may be an iterative process and may involve interaction with the user (e.g., interaction 130). In instances where the desired similarity is actually a desired type and/or degree of dissimilarity, found content may be grouped according to the clusters it has in common with the input or source content 122, and then only one or a small number of content may be selected from each cluster to provide a desired level of diversity or dissimilarity. Once a desired ranking of the clusters and/or found content is established, the found content is output to the user at a computing device according to the arrangement determined at block 512.

At block 514, the content and user interaction analyzer 112 monitors the user's interactions with the output generated at block 512. Based on the user's interactions, the content and user interaction analyzer 112 may update the proximity scores associated with certain clusters and/or found content, and/or one or more of the weights described above, and store the updated scores and/or weights in the similarity model 120. For instance, if block 512 assigned a high ranking to a certain found content, but the user does not access that content from the returned results, then block 514 may update the proximity score associated with that content.

Referring now to FIG. 6, an illustrative embodiment of the computing device 110 is shown. The computing device 110 includes at least one processor 610 and an input/output (I/O) subsystem 612. In the illustrative embodiment, the computing device 110 is embodied as a personal computing device such as, for example, a mobile or handheld computing device, smartphone, personal digital assistant, laptop computer, tablet computer, or desktop computer. However, the computing device 110 may be embodied as any type of computing device such as, for example, a server, an enterprise computer system, a network of computers, or other electronic device or system.

The processor 610 includes one or more processor cores (e.g. microprocessors). The I/O subsystem 612 typically includes, among other things, an I/O controller, a memory controller, and one or more I/O ports (not shown). The processor 610 and the I/O subsystem 612 are communicatively coupled to a memory 614. The memory 614 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The I/O subsystem 612 is communicatively coupled to at least one input device 616, at least one data storage 618, at least one output device 620, and at least one network interface 622. The I/O subsystem 612 may be communicatively coupled to one or more other peripheral devices such as a graphics, sound and/or video adapter (not shown), depending upon, for example, the intended use of the computing device 110.

The input device 616 may include a keyboard, keypad, touch screen, microphone, or other suitable device for accepting input from a user (e.g. interactions 122, 126, 130). The output device 620 may include a text, graphics, and/or video display screen, speaker, or other suitable device for presenting output (e.g. possible modifications or clarifications 124, 128, found content 132, etc.), to the user.

The network interface 622 communicatively couples the computing device 110 to one or more networks 624, which may include a local area network, wide area network, personal cloud, enterprise cloud, public cloud, and/or the Internet. Accordingly, the network interface 624 may include a wired or wireless Ethernet adapter, Wi-Fi adapter or other suitable device as may be needed, pursuant to the specifications and/or design of the particular network 624.

The data storage 618 may include one or more hard drives or other suitable data storage devices (e.g., memory cards, memory sticks, and/or others). In the illustrative embodiment, an operating system (O/S) 626 resides in the data storage 618. The operating system 626 is, for example, a Microsoft Windows®, Linux, or other operating system, or other similar set of instructions, which may be designed specifically for a particular type of computing device, for example, a discrete, handheld, or portable electronic device or smart phone.

Any or each of the content retrieval system 100, the search realm 118, and the similarity model 120 may be local to the computing device 110 or distributed across multiple computing devices 110. In the illustrated example, a content retrieval system CRS(1) 628 includes at least one instance of the content retrieval system 100, a similarity model SM(1) 630 includes at least one instance of the similarity model 120, and a search realm SR(1) 632 includes at least one instance of the search realm 118. At least a portion of each of the CRS(1) 628, SM(1) 630, and SR(1) 632 is stored in the data storage 618. Portions of the O/S 626, CRS(1) 628, SM(1) 630, and/or SR(1) 632 may be copied to the memory 614 during operation, for faster processing or other reasons.

In some embodiments, the CRS(1) 628 may include a client application or front-end user interface for the content retrieval system 100, while a back end or server application for the content retrieval system 100 may reside on the network 624 (e.g. as a content retrieval system CRS(2) 634). Likewise, the SM(1) 630 may include aspects of the similarity model 120 that are local to the computing device 110, such as locally created documents; while other aspects of the similarity model 120, such as records of the user's electronic interactions with networked systems, may reside on the network 624 (e.g. as a similarity model SM(2) 636). Similarly, the SR(1) 632 may include aspects of the search realm 118 that are local to the computing device 110, such as locally created documents; while other aspects of the search realm 118, such as publicly available content, may reside on the network 624 (e.g. as a search realm SR(2) 640).

In some embodiments, the entire content retrieval system 100, the entire similarity model 120, and the entire search realm 118 may be stored in the data storage 618 (e.g. as CRS(1) 628, and SM(1) 630, and SR(1) 632) of the computing device 110. In some embodiments, the CRS(1) 628 and/or the CRS(2) 634 may have access to all or portions of one or more other similarity models (e.g. one or more similarity models SM(3) 638). In this way, the content retrieval system 100 can leverage not only similarity information that is contained in the local similarity model (e.g. SM(1) 630), but also similarity information contained in other similarity models to which it has been granted access (e.g. by family, friends or colleagues of the user, or automated processes). Similarly, an instance of the content retrieval system 100 (such as an instance of a content retrieval application used by a certain person or automated process) may have access to all or portions of one or more other similarity model(s) SM(1) 630 and/or SM(2) 636, depending on the particular requirements or design of a given content retrieval system 100.

The computing device 110 may include other components, sub-components, and devices not illustrated in FIG. 6 for clarity of the description. Further, it should be appreciated that in embodiments where one or more of the instances of content retrieval systems 628, 634, search realms 632, 640, and/or similarity models 630, 636, 638 are distributed or implemented on a network, such systems should be capable of tracking and maintaining the identity of the user(s) using or associated with the respective content retrieval systems 628, 634, search realms 632, 640, and/or similarity models 630, 636, 638 as may be needed. This can be done, for example, by capturing a user's logon ID, password, device address (such as an IP address), and/or other suitable identifying information and using suitable authentication and/or validation techniques.

In general, the components of the computing device 110 are communicatively coupled as shown in FIG. 6, by one or more signal paths, which are represented schematically as bidirectional arrows 642, 644, 646, 648, 650, 652, 654, 656, 658, 660, 662. Such signal paths may be embodied as any type of wired or wireless signal paths capable of facilitating communication between the respective devices. For example, the signal paths may be embodied as any number of wires, printed circuit board traces, busses, point-to-point interconnects, intervening devices, and/or others.

While the invention has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure have been described in the context of a content retrieval system, it will be understood that the various aspects have other applications, for example, any application in which it is desired to find content having a desired type and/or degree of similarity to another piece of content. Such applications may include, for example, interactive web or mobile-device applications and automated content delivery systems.

The invention claimed is:

1. A method, comprising:
maintaining a computerized similarity model comprising information relating to associations of electronic content with other electronic content, the electronic content comprising at least one of textual content and non-textual content, the associations resulting from executing a plurality of computerized content analyzers to extract information from the electronic content, each content analyzer being associated with at least one similarity metric usable to determine a type or degree of similarity of electronic content;
with a computing device, determining a plurality of similarity types based on an input or source content, each similarity type relating to a different characteristic of the input or source content;
weighting each of the plurality of similarity types based on user-specific context information;
identifying, using the similarity model, electronic content that has at least one association in common with the input or source content according to one or more of the similarity types;
ranking the identified electronic content in accordance with the weighting of the similarity types; and
outputting data relating to one or more of the identified electronic content.

2. The method of claim 1, comprising executing a content analyzer configured to identify textual content in the electronic content, identify most important words in the textual content, associate at least one textual element with the electronic content based on the identified most important words, use the at least one textual element to create associations between or among the electronic content, and store the associations between or among the electronic content in the similarity model.

3. The method of claim 1, comprising executing a content analyzer configured to identify textual content in the electronic content, perform semantic analysis of the textual content, associate at least one textual element with the electronic content based on the semantic analysis, use the at least one textual element to create associations between or among the electronic content, and store the associations between or among the electronic content in the similarity model.

4. The method of claim 1, comprising executing a content analyzer configured to determine whether the electronic content comprises at least one Uniform Resource Locator, and in response to determining that the electronic content comprises at least one Uniform Resource Locator, analyzing electronic content associated with the at least one Uniform Resource Locator.

5. The method of claim 1, comprising executing a content analyzer configured to associate the electronic content with at least one topic, associate at least one textual element with the electronic content based on the association of the electronic content with the at least one topic, use the at least one textual element to create associations between or among the electronic content, and store the associations between or among the electronic content in the similarity model.

6. The method of claim 1, comprising executing a content analyzer configured to process electronic content comprising non-textual content, associate at least one textual element comprising textual content relating to the non-textual content with the electronic content, use the at least one textual element to create associations between or among the electronic content, and store the associations between or among the electronic content in the similarity model.

7. The method of claim 6, comprising identifying a graphic in the electronic content, associating at least one textual element comprising textual content relating to the graphic with the electronic content, using the at least one textual element to create associations between or among the electronic content, and storing the associations between or among the electronic content in the similarity model.

8. The method of claim 6, comprising determining a layout of the electronic content, associating at least one textual element comprising textual content relating to the layout with the electronic content, using the at least one textual element to create associations between or among the electronic content, and storing the associations between or among the electronic content in the similarity model.

9. The method of claim 6, comprising identifying an image in the electronic content, associating at least one textual element comprising textual content relating to the image with the electronic content, using the at least one textual element to create associations between or among the electronic content, and storing the associations between or among the electronic content in the similarity model.

10. The method of claim 1, comprising executing a content analyzer configured to associate the electronic content with a style of writing, associating at least one textual element relating to the style of writing with the electronic content, using the at least one textual element to create associations between or among the electronic content, and storing the associations between or among the electronic content in the similarity model.

11. The method of claim 1, comprising executing a content analyzer configured to identify textual content in the electronic content, associating the textual content with an indicator of sentiment, associating at least one textual element relating to the sentiment with the electronic content, using the at least one textual element to create associations between or among the electronic content, and storing the associations between or among the electronic content in the similarity model.

12. The method of claim 1, comprising executing a content analyzer configured to associate the electronic content with a subject matter domain, associating at least one textual element comprising textual content relating to the domain with the electronic content, using the at least one textual element to create associations between or among the electronic content, and storing the associations between or among the electronic content in the similarity model.

13. The method of claim 1, comprising executing a content analyzer configured to extract a sequence of textual content from the electronic content, generate a vector representation of the sequence of textual content, the vector representation comprising a plurality of digits, each digit having an association with an aspect of the textual content, associate the vector with the electronic content, use the vector to create associations between or among the electronic content, and store the associations between or among the electronic content in the similarity model.

14. The method of claim 1, comprising determining the desired type or degree of similarity based on at least one of a textual element associated with the input or source content and at least one input from a user.

15. The method of claim 1, comprising monitoring electronic interaction of a user with the electronic content and determining the desired type or degree of similarity based on the user's electronic interaction with the electronic content.

16. The method of claim 1, comprising determining the desired type or degree of similarity based on a weight associated with the at least one similarity metric.

17. The method of claim 16, comprising adjusting the weight associated with the at least one of the similarity metric to achieve a lesser or greater degree of similarity.

18. The method of claim 1, comprising selecting at least one content analyzer from the plurality of content analyzers based on the desired type or degree of similarity and executing only the selected at least one content analyzer.

19. The method of claim 1, comprising performing a clustering analysis on the textual elements associated with the electronic content, performing a clustering analysis on textual elements associated with the input or source content, and identifying clusters associated with both the input or source content and at least one of the electronic content.

20. The method of claim 1, comprising ranking electronic content having a common association with the input or source content based on a calculated proximity of the electronic content to the input or source content and interactively arranging the electronic content having a common association with the input or source content based on the ranking.

21. The method of claim 1, wherein the input or source content comprises a plurality of pieces of electronic content, comprising merging the plurality of pieces of electronic content into the input or source content.

22. The method of claim 1, comprising, for each electronic content having an association in common with the input or source content, calculating a proximity score for each of the at least one similarity metric and arranging the electronic content having an association in common with the input or source content based on the proximity score.

23. The method of claim 1, wherein the input or source content is specified by at least one of a user and an automated process.

24. The method of claim 1, comprising associating at least one textual element with the electronic content based on the executing of the plurality of computerized content analyzers.

25. The method of claim 1, comprising executing a first content analyzer to perform a first method of analysis of the electronic content and executing a second content analyzer to perform a second method of analysis of the electronic content.

26. The method of claim 1, comprising maintaining a computerized user-specific profile comprising information relating to at least one of user-specific information and user-specific interactions with electronic content, and determining, using the user-specific profile, whether any of the electronic content has at least one association in common with an input or source content.

27. The method of claim 1, comprising interactively-arranging the electronic content having a common association with the input or source content based on the desired type or degree of similarity of the electronic content to the input or source content.

28. The method of claim 1, comprising interactively-selecting the desired type or degree of similarity used to determine whether the electronic content has a common association with the input or source content.

29. At least one non-transitory computer accessible storage medium comprising a plurality of instructions that in response to being executed, result in a computing device:
  analyzing an input or source content using a plurality of content analyzers, each content analyzer associated with at least one similarity metric usable to determine a type or degree of similarity of content,
  determining a plurality of similarity types based on the analyzed input or source content, each similarity type relating to a different characteristic of the input or source content;
  weighting each of the plurality of similarity types based on user-specific context information;
  identifying, based on the analyzing of the input or source content using the plurality of content analyzers, at least one piece of electronic content of a plurality of pieces of electronic content that has an association in common with the input or source content according to one or more of the similarity types;
  responsively adjusting the weight associated with the at least one similarity metric based on at least one interaction of a user with the identified electronic content;
  ranking the identified electronic content in accordance with the weighting of the similarity types; and
  visually arranging the identified electronic content based on the weight associated with the at least one similarity metric.

30. The at least one non-transitory computer accessible storage medium of claim 29, configured to arrange the identified electronic content according to a first similarity metric and re-arrange the identified electronic content according to a second similarity metric.

31. The at least one non-transitory computer accessible storage medium of claim 29, configured to arrange the identified electronic content into a plurality of clusters, select an electronic content from each cluster, and display only the selected electronic content.

32. A computing device comprising:

at least one processor, and at least one memory device coupled to the at least one processor, the at least one memory device having stored therein a plurality of instructions that when executed by the at least one processor, cause the at least one processor to:

execute a plurality of content analyzers to extract or derive information from each of a plurality of pieces of electronic content determining a plurality of similarity types based on the extracted or derived information, each similarity type relating to a different characteristic of the pieces of electronic content;

weight each of the plurality of similarity types based on user-specific context information;

rank the analyzed electronic content in accordance with the weighting of the plurality of similarity types;

maintain a database comprising information relating to associations of the analyzed electronic content with one or more others of the analyzed electronic content based on results of the executing of the plurality of content analyzers;

receive a search request from a user;

use the database to determine whether any of the analyzed electronic content has a first degree or type of similarity to the search request;

output information relating to at least one possible modification of the first degree or type of similarity;

receive input from the user relating to the at least one possible modification; and in response to the received input, use the database to determine whether any of the analyzed pieces of content has a second degree or type of similarity to the search request, wherein the second degree or type of similarity relates to a different characteristic of the content than the first degree or type of similarity.

33. The computing device of claim 32, configured to maintain a user-specific database comprising information relating to interactions of a user with electronic content and use the user-specific database to determine whether any of the analyzed pieces of content has the second degree or type of similarity to the search request.

* * * * *